(12) United States Patent
Liu et al.

(10) Patent No.: US 11,429,368 B2
(45) Date of Patent: Aug. 30, 2022

(54) VIRTUAL DEVICE HANDLERS TO PROCESS UPDATE CAPSULE PAYLOADS

(71) Applicant: HEWLETT-PACKARD DEVELOPMENT COMPANY, L.P., Spring, TX (US)

(72) Inventors: Wei Ze Liu, Houston, TX (US); Lan Wang, Houston, TX (US); Xianglong Du, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,322

(22) PCT Filed: Apr. 17, 2018

(86) PCT No.: PCT/US2018/027963
§ 371 (c)(1),
(2) Date: Jul. 26, 2019

(87) PCT Pub. No.: WO2019/203808
PCT Pub. Date: Oct. 24, 2019

(65) Prior Publication Data
US 2021/0326126 A1 Oct. 21, 2021

(51) Int. Cl.
*G06F 9/445* (2018.01)
*G06F 8/65* (2018.01)

(52) U.S. Cl.
CPC ............ *G06F 8/65* (2013.01); *G06F 9/44505* (2013.01)

(58) Field of Classification Search
CPC .............................. G06F 8/65; G06F 9/44505
USPC ................................................... 717/168–178
See application file for complete search history.

(56) References Cited

U.S. PATENT DOCUMENTS

| | | | |
|---|---|---|---|
| 7,069,452 B1 | 6/2006 | Hind et al. | |
| 7,984,286 B2 | 7/2011 | Zimmer et al. | |
| 8,117,435 B2 | 2/2012 | Kuang et al. | |
| 8,423,756 B2 | 4/2013 | Harmer | |
| 9,772,838 B2 | 9/2017 | Cavalaris et al. | |
| 2003/0135705 A1 | 7/2003 | Montero | |
| 2012/0260082 A1 | 10/2012 | Bobzin | |
| 2012/0272226 A1 | 10/2012 | Yang et al. | |
| 2016/0009179 A1* | 1/2016 | Biderman | B60L 58/10 |
| | | | 701/22 |
| 2016/0202964 A1 | 7/2016 | Butcher et al. | |
| 2016/0241398 A1 | 8/2016 | Lewis | |
| 2017/0010875 A1 | 1/2017 | Martinez et al. | |
| 2018/0004502 A1 | 1/2018 | Samuel et al. | |
| 2020/0114753 A1* | 4/2020 | Biderman | A61B 5/0002 |

* cited by examiner

*Primary Examiner* — Chuck O Kendall
(74) *Attorney, Agent, or Firm* — Conley Rose, P.C.

(57) ABSTRACT

A storage may store machine-readable instructions for execution by a processor. Execution of the machine-readable instructions may cause the processor to receive an update capsule via a firmware update interface. The update capsule may include a device identifier and a payload. The payload may include data that is different from a firmware update. Execution of the machine-readable instructions may cause the processor to execute a virtual device handler, based on the device identifier, to process the payload.

17 Claims, 11 Drawing Sheets

VIRTUAL DEVICE HANDLERS TO PROCESS UPDATE CAPSULE PAYLOADS

BACKGROUND

Computer systems may include hardware resources that have firmware. Firmware may include FPGA images and embedded code for execution by processors on the hardware resources.

BRIEF DESCRIPTION OF THE DRAWINGS

Various examples will be described below referring to the following figures.

DETAILED DESCRIPTION

Figure 1:
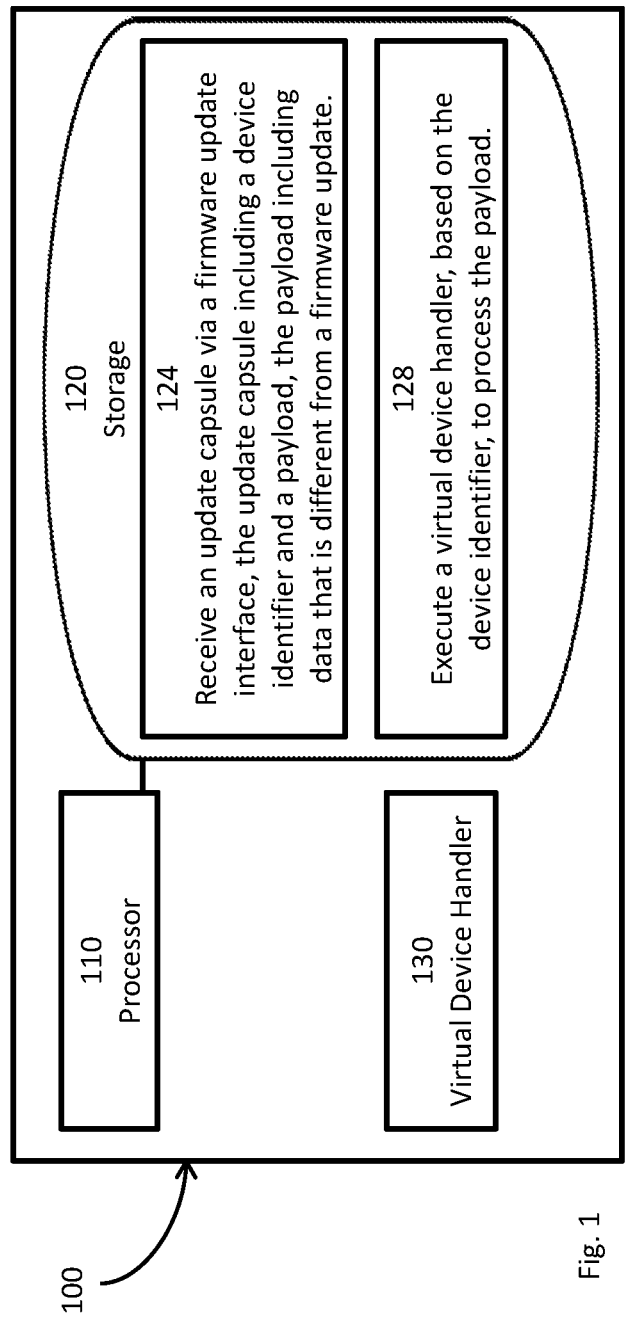
FIG. 1 shows a computer system with a virtual device handler to handle update capsules in accordance with various examples.

Distribution of data may involve creating an entire framework through which to distribute the data. On computer systems, various different actors may have a desire to distribute data. The actors may devise their own frameworks, leading to multiple different data distribution frameworks on a computer system, with varying levels of security. Compromising just one of the distribution frameworks may compromise a computer system. As the number of frameworks on a computer system increase, so may the chances that any one of the frameworks may be compromised.

By utilizing an existing distribution framework, data and messages may be sent to a computer system, prompting some action by the computer system. One distribution framework that may be used is a firmware update interface, such as the one defined by Unified Extensible Firmware Interface (UEFI) capsule update. The security measures of the firmware update interface may be used, but the messages or data distributed through the firmware update interface may not be able to include firmware updates.

In one example in accordance with the present disclosure, a system is provided. The system comprises a processor, and storage to store machine-readable instructions, where execution of the machine-readable instructions by the processor causes the processor to receive an update capsule via a firmware update interface, the update capsule including a device identifier and a payload, the payload including data that is different from a firmware update, and execute a virtual device handler, based on the device identifier, to process the payload.

In one example in accordance with the present disclosure, a system is provided. The system comprises a processor, a hardware resource, including a hardware resource identifier, and storage to store machine-readable instructions, where execution of the machine-readable instructions by the processor causes the processor to receive an update capsule via a firmware update interface, the update capsule including a device identifier and a payload, the payload including an update resource identifier, execute a virtual device handler, based on the device identifier, and where execution of the virtual device handler by the processor causes the processor to compare the hardware resource identifier and the update resource identifier.

In one example in accordance with the present disclosure, a non-transitory computer-readable medium storing machine-readable instructions that, when executed by a processor, cause the processor to perform an operation is provided. The operation comprises receiving an update capsule via a firmware update interface, extracting a device identifier from the update capsule, extracting a payload from the update capsule, identifying a virtual device handler, based on the device identifier, and executing the virtual device handler, to process the payload, where the payload includes data that is different from a firmware update.

Storage is a computer-readable medium to which data can be written or retrieved. Storage may be non-volatile storage, such as a hard drive, solid state drive, Flash memory, or electrically erasable programmable read only memory (EEPROM). Storage may be volatile storage, such as a random access memory (RAM) or cache. Storage may be a read-only medium or a write-only medium.

A processor is a device capable of executing machine-readable instructions. A processor may be a microprocessor, a controller, a microcontroller, a microcomputer, a programmable gate array, such as a field programmable gate array (FPGA) or mask programmable gate array (MPGA), or a system on a chip. A processor may be included on a silicon chip or may comprise discrete logic components. A processor may be a virtual processor, such as a virtual machine used to execute interpretable code such as Java, or such as a virtual computer being executed on a time-share basis, such as running on a server.

Machine-readable instructions are instructions capable of being read and interpreted by a machine, such as a processor, for execution. Machine-readable instructions include machine code, assembly code, compiled code, and interpretable code used by a virtual machine, such as Java.

A hardware resource is a physical device that provides a functionality to a computer system. A hardware resource may, for example, be connected to the computer system via a bus, such as an external or internal bus. A hardware resource may be, for example, storage, a battery, a video card, or a printer.

A firmware update is a set of machine-readable instructions for making changes to the firmware of a hardware resource. A firmware update may replace the existing firmware of the hardware resource or modify portions of the existing firmware. The machine-readable instructions may be executed by a processor of the computer system or a processor of the hardware resource.

A firmware update interface is a software and/or hardware interface for sending or receiving firmware updates. Firmware update interface includes, for example, the interface in the UEFI for updating firmware on a computer system, as well as predecessor and later systems.

An update capsule is a collection of data for receipt by a computer system.

A virtual device handler is a set of machine-readable instructions associated with a virtual device to handle events associated with the virtual device. For example, receipt of an update capsule may be an event associated with a virtual device, and the virtual device handler may include machine-readable instructions for processing the update capsule or a payload of the update capsule.

FIG. 1 shows a computer system 100 with a virtual device handler 130 to handle update capsules in accordance with various examples. Computer system 100 may include a processor 110 and storage 120. Processor 110 may be coupled to storage 120. Storage 120 may store machine-readable instructions 124, 128. Processor 110 may execute machine-readable instructions 124,128. Machine-readable instruction 124 may cause the processor 110 to receive an update capsule via a firmware update interface, the update capsule including a device identifier and a payload, the payload including data that is different from a firmware update. Machine-readable instruction 128 may cause the processor 110 to execute a virtual device handler 130, based on the device identifier, to process the payload. Virtual device handler 130 may comprise a set of machine-readable instructions and may be stored in storage 120.

An update capsule may be transferred to the processor 110 through a firmware update interface. The firmware update interface may check a known location for firmware updates. The known location may be a location on the Internet or other network identified by a uniform resource locator (URL). The known location may be a location on the local computer system 100. The known location may redirect the computer system 100 to another location. The update capsule may be transferred to the processor 110 as part of a managed update performed by systems administrators of a company's computer systems. The transfer of an update capsule may be initiated by a user of the computer system 100. The transfer of an update capsule may be pushed by a package distribution system based on certain policies on the computer system 100. A computer system 100 may receive update capsules from different manufacturers or distributors.

Figure 2:
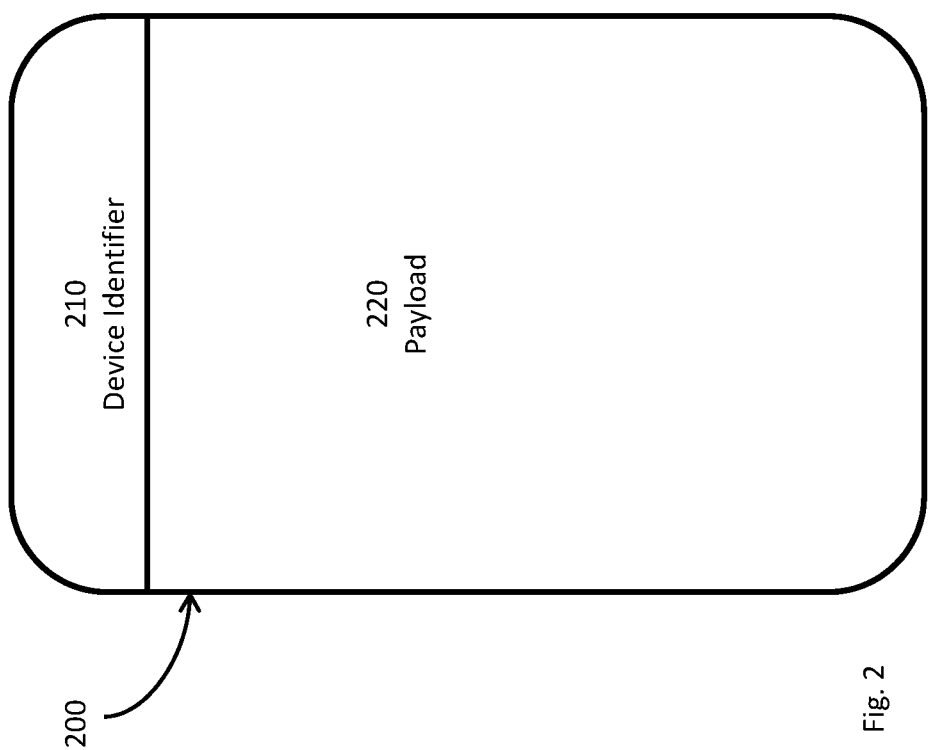
FIG. 2 shows an update capsule in accordance with various examples.

FIG. 2 shows an update capsule 200 in accordance with various examples. Update capsule 200 may include a device identifier 210 and a payload 220. The device identifier 210 may identify a particular device in a computer system. The device identifier 210 may identify a virtual device or virtual device handler.

Figure 3:
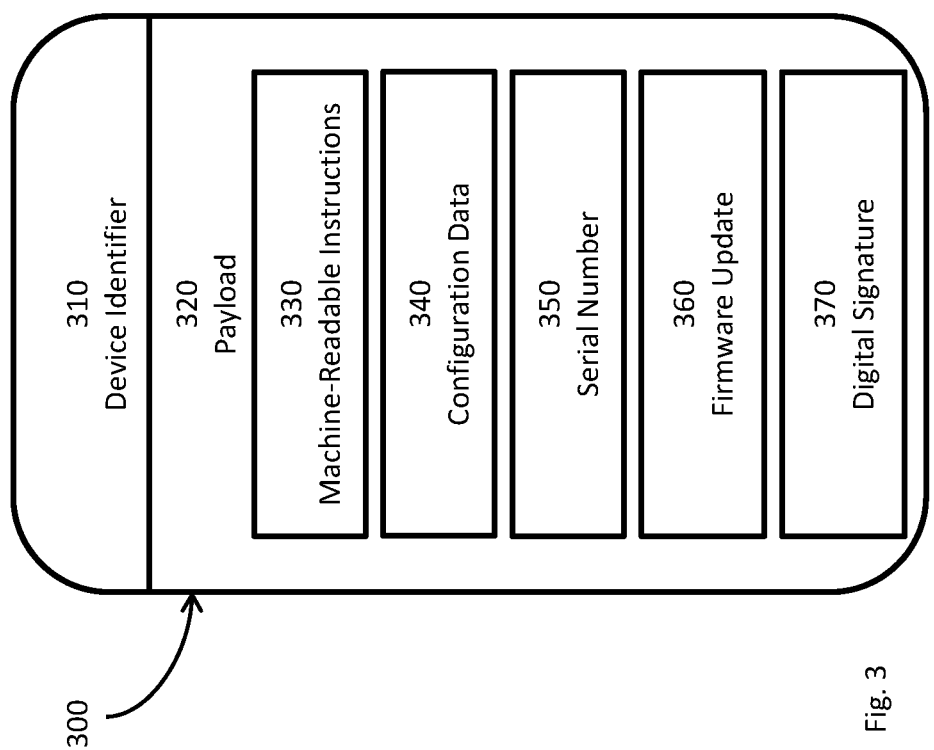
FIG. 3 shows an update capsule in accordance with various examples.

FIG. 3 shows an update capsule 300 in accordance with various examples. Update capsule 300 may include a device identifier 310 and a payload 320. Payload 320 may include machine-readable instructions 330, configuration data 340, a serial number 350, a firmware update 360, and a digital signature 370. The device identifier 310 may identify a particular device in a computer system. The device identifier 310 may identify a virtual device or virtual device handler.

The machine-readable instructions 330 may be instructions for execution by a processor while processing the update capsule 300 or at a later point in time. The machine-readable instructions 330 may provide a message to a user of the computer system, execute a program stored on the computer system, or perform any other task performable by execution of machine-readable instructions 330.

Configuration data 340 may be used by a device handler or virtual device handler to modify data settings, such as software settings for a computer program, device configuration settings for a hardware resource in the computer system, or initialization settings used when starting up and initializing the computer system, such as when booting the device using UEFI, basic input/output system (BIOS), or another program or process.

Serial number 350 may correspond to the serial number of a hardware resource in the computer system. Serial number 350 may uniquely identify a hardware resource. Serial number 350 may identify a model number of the hardware resource, a production run of the hardware resource, or some other categorization of the hardware resource.

Digital signature 370 may be a signature for the payload 320 or update capsule 300 created using cryptographic techniques. The digital signature 370 may be provided by a manufacturer of the computer system or a manufacturer of a component of the computer system. The digital signature 370 may be provided by a software manufacturer, distributor, or a systems administrator. The digital signature 370 may be created using a public-key/private-key pair, with the computer system using the public-key to verify the signature. According to some examples, the payload 320 or portion of the payload 320 may be encrypted.

Figure 4:
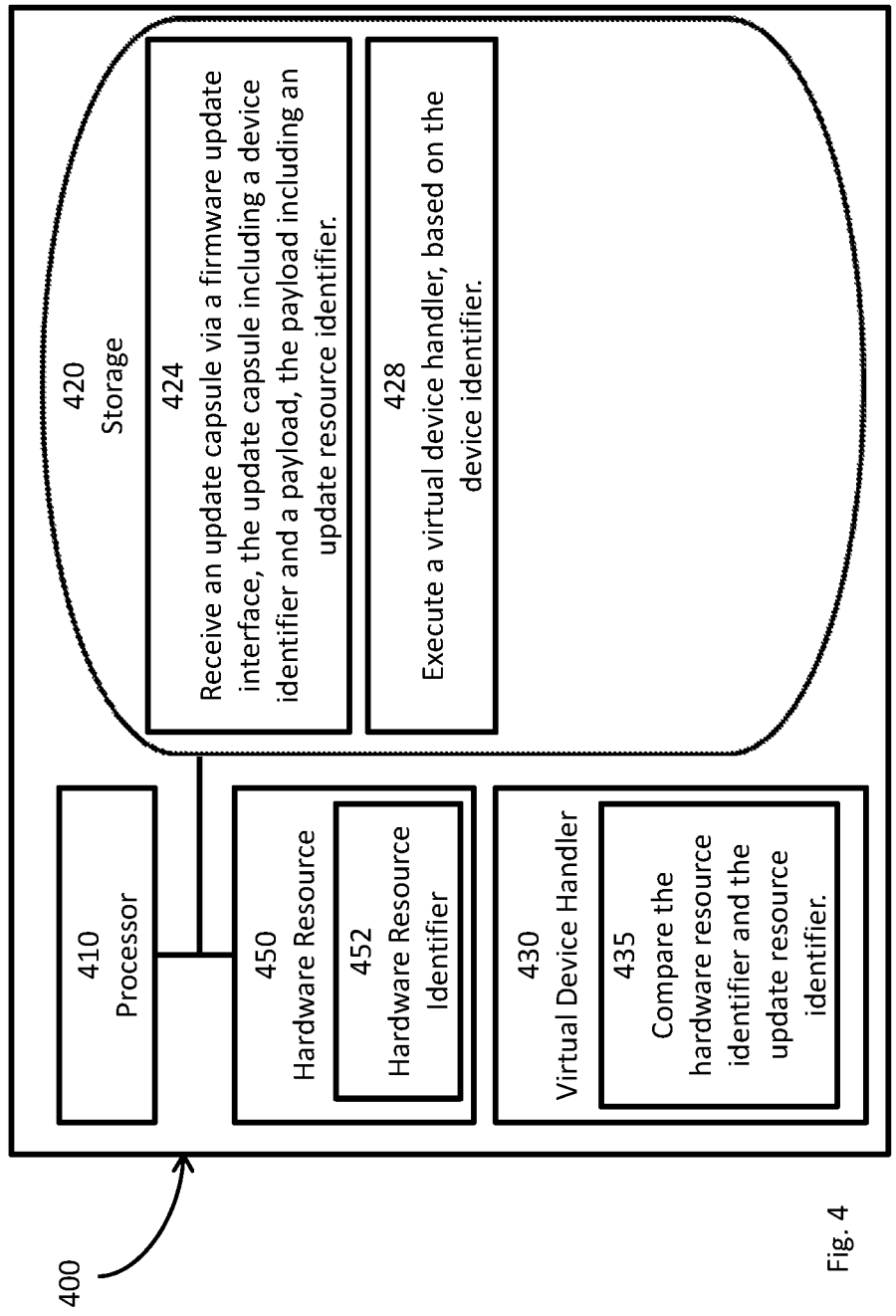
FIG. 4 shows a computer system with a hardware resource and a virtual device handler to handle update capsules in accordance with various examples.

FIG. 4 shows a computer system 400 with a hardware resource 450 and a virtual device handler 430 to handle update capsules in accordance with various examples. Computer system 400 may include processor 410, hardware resource 450, virtual device handler 430, and storage 420. Processor 410 may be coupled to storage 420 and hardware resource 450.

Hardware resource 450 may include hardware resource identifier 452. Hardware resource identifier 452 may be used to identify hardware resource 450 and distinguish the hardware resource 450 from other hardware resources in the computer system 400.

Virtual device handler 430 may include machine-readable instruction 435. When virtual device handler 430 is executed by the processor 410, machine-readable instruction 435 may be executed by the processor 410 and cause the processor 410 to compare the hardware resource identifier 452 and the update resource identifier. The update resource identifier may be included in the payload of an update capsule. Virtual device handler 430 may comprise a set of machine-readable instructions and may be stored in storage 420.

Storage 420 may include machine-readable instructions 424, 428. When executed by processor 410, machine-readable instruction 424 may cause the processor 410 to receive an update capsule via a firmware update interface, the update capsule including a device identifier and a payload, the payload including an update resource identifier. The update resource identifier may correspond to the hardware resource identifier 452, thus identifying hardware resource 450. Storage 420 may include a table of hardware resource identifiers 452, virtual device handlers 430, and device handlers associated with the hardware resource identifiers 452 and hardware resources 450. When executed by processor 410, machine-readable instruction 428 may cause the processor 410 to execute a virtual device handler, based on the device identifier.

In various examples, a device identifier included in a payload of an update capsule may identify a virtual device handler 430 to be executed. The payload may further include an update resource identifier that corresponds to a hardware resource identifier 452 of a hardware resource 450. Hardware resource 450 may have its own device handler other than virtual device handler 430. Virtual device handler 430 may identify hardware resource 450 based on the update resource identifier in the payload. In response to identifying hardware resource 450 based on the update resource identifier, virtual device handler 430 may perform some action with regards to hardware resource 450. In various examples, virtual device handler 430 may change a setting of hardware resource 450, virtual device handler 430 may enable or disable hardware resource 450, virtual device handler 430 may query data from hardware resource 450, or virtual device handler 430 may present a message to a user of computer system 400 regarding hardware resource 450. Virtual device handler 430 may perform such actions on a different hardware resource identified by a different update resource identifier in another update capsule. An update capsule may include multiple update resource identifiers corresponding to different hardware resources.

Figure 5:
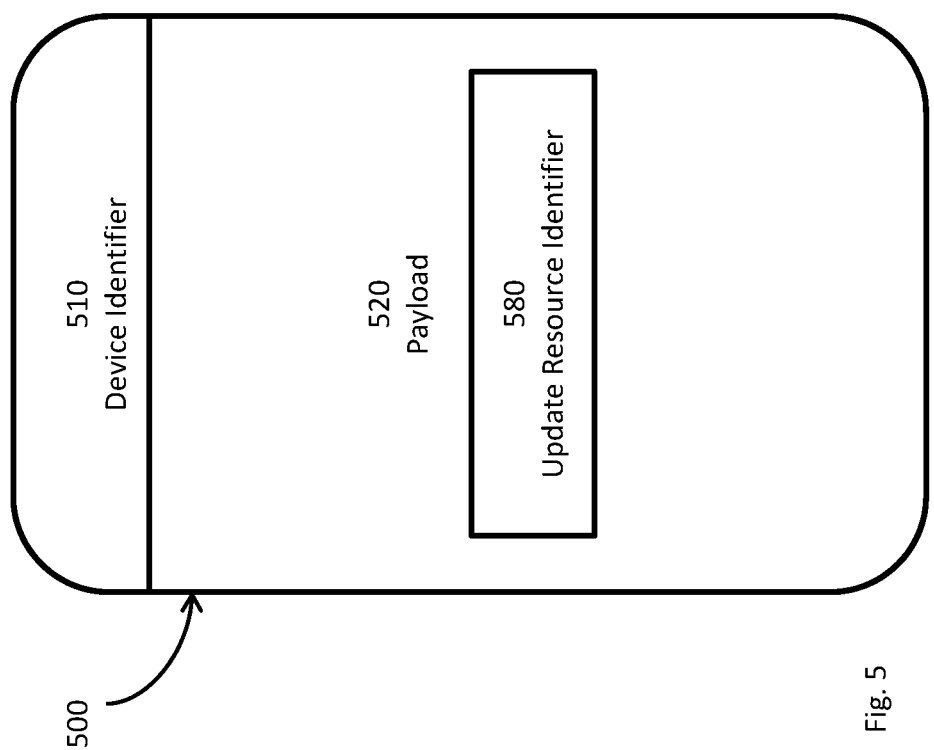
FIG. 5 shows an update capsule in accordance with various examples.

FIG. 5 shows update capsule 500 in accordance with various examples. Update capsule 500 may include a device identifier 510 and payload 520. Payload 520 may include update resource identifier 580. In various examples, device identifier 510 may identify a virtual device handler. Update resource identifier 580 may identify a hardware resource of a computer system. By inclusion of update resource identifier 580, update capsule may cause the virtual device handler to take some action with respect to the hardware resource identified by update resource identifier 580, even if virtual device handler is not the device handler for the hardware resource.

Figure 6:
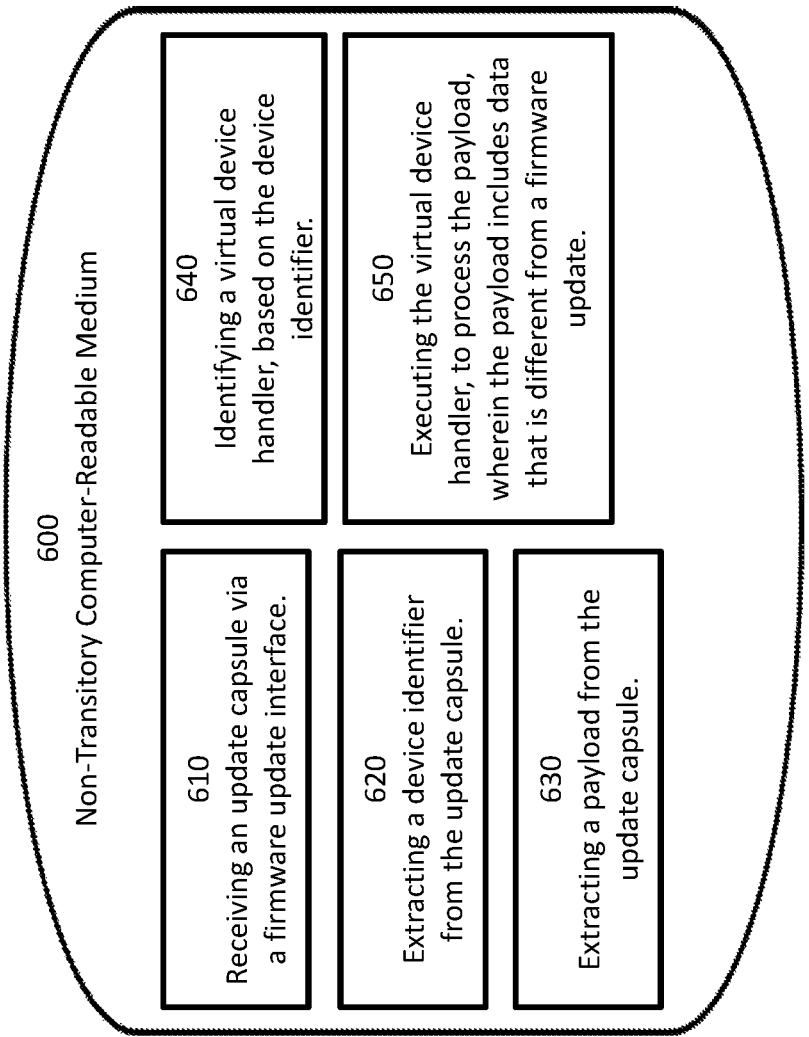
FIG. 6 shows a non-transitory computer-readable medium including machine-readable instructions in accordance with various examples.

FIG. 6 shows a non-transitory computer-readable medium 600 including machine-readable instructions 610, 620, 630, 640, 650 in accordance with various examples. Non-transitory computer-readable medium 600 may be storage. When executed by a processor, machine-readable instruction 610 may cause the processor to receive an update capsule via a firmware update interface. When executed by a processor, machine-readable instruction 620 may cause the processor to extract a device identifier from the update capsule. When executed by a processor, machine-readable instruction 630 may cause the processor to extract a payload from the update capsule. In various examples, only a portion of the payload may be extracted from the update capsule. When executed by a processor, machine-readable instruction 640 may cause the processor to identify a virtual device handler, based on the device identifier. When executed by a processor, machine-readable instruction 650 may cause the processor to execute the virtual device handler, to process the payload, where the payload includes data that is different from a firmware update.

Figure 7:
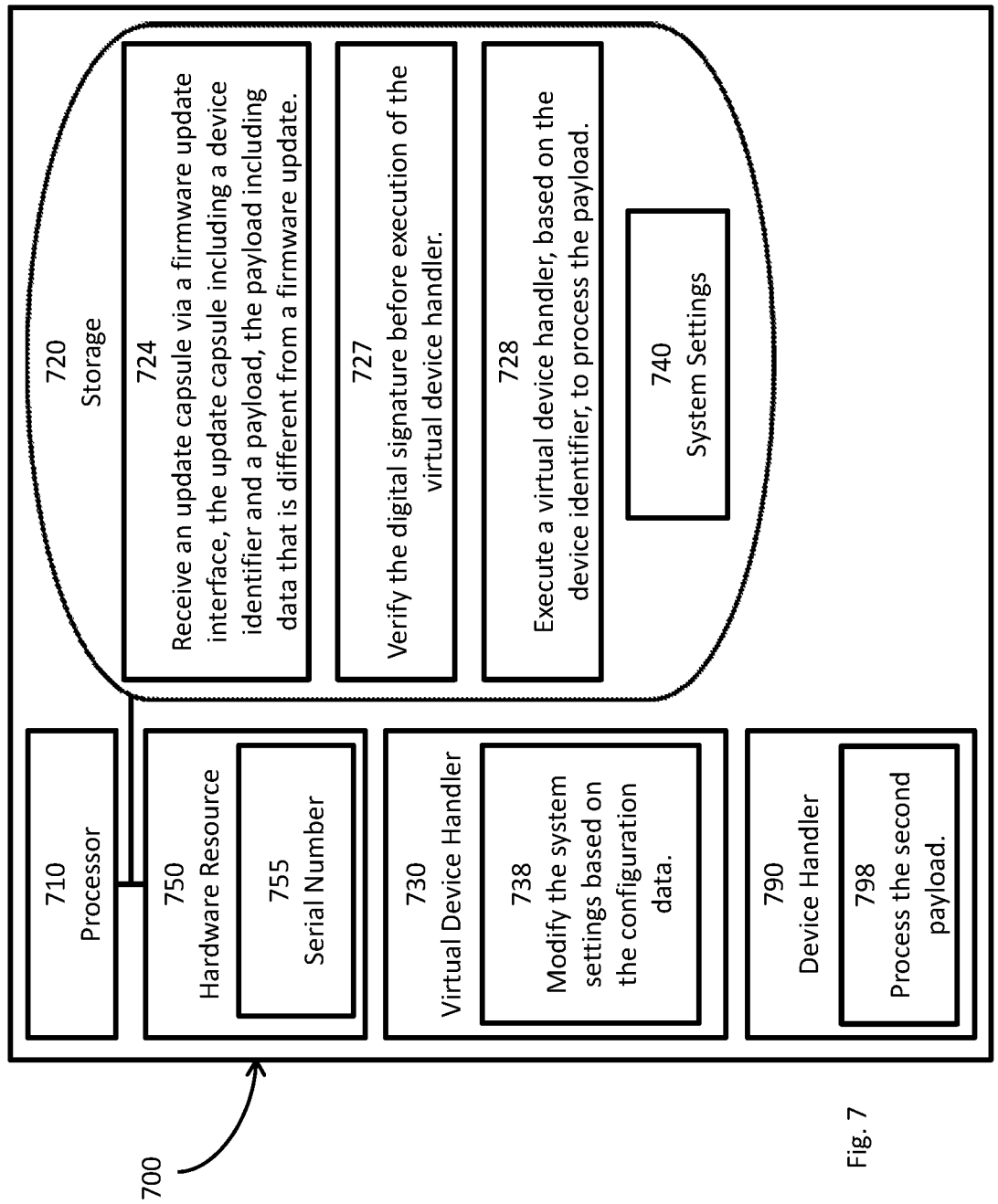
FIG. 7 shows a computer system with a device handler and virtual device handler to handle update capsules in accordance with various examples.

FIG. 7 shows a computer system 700 with a device handler 790 and virtual device handler 730 to handle update capsules in accordance with various examples. Computer system 700 may include processor 710, storage 720, hardware resource 750, virtual device handler 730, and device handler 790. Processor 710 may be coupled to storage 720 and hardware resource 750.

Hardware resource 750 may include serial number 755. Serial number 755 may identify a model of hardware resource 750. Serial number 755 may identify a version or production run of hardware resource 750.

Storage 720 may include system settings 740 and machine-readable instructions 724, 727, 728. System settings 740 may be settings for a software program or hardware resource 750 of computer system 700. System settings may include initialization settings used when starting up or initializing the computer system, such as when booting the device using UEFI, basic input/output system (BIOS), or another program or process. When executed by a processor, machine-readable instruction 724 may cause the processor to receive an update capsule via a firmware update interface, the update capsule including a device identifier and a payload, the payload including data that is different from a firmware update. The update capsule may include a payload and a digital signature. When executed by a processor, machine-readable instruction 727 may cause the processor to verify the digital signature before execution of the virtual device handler 730. When executed by a processor, machine-readable instruction 728 may cause the processor to execute a virtual device handler 730, based on the device identifier, to process the payload.

The payload for processing by the virtual device handler 730 may include configuration data. Virtual device handler 730 may include machine-readable instruction 738. When executed by a processor, machine-readable instruction 738 may cause the processor to modify the system settings based on the configuration data. Virtual device handler 730 may comprise a set of machine-readable instructions and may be stored in storage 720.

Computer system 700 may receive a second update capsule with a second payload, as discussed in reference to FIG. 8 below. The second update capsule may include a device identifier that identifies hardware resource 750. Device handler 790 may correspond to hardware resource 750 and be executed to handle the second payload. Device Handler 790 may include machine-readable instruction 798. When executed by a processor, machine-readable instruction 798 may cause the processor to process the second payload. Device handler 790 may comprise a set of machine-readable instructions and may be stored in storage 720.

Figure 8:
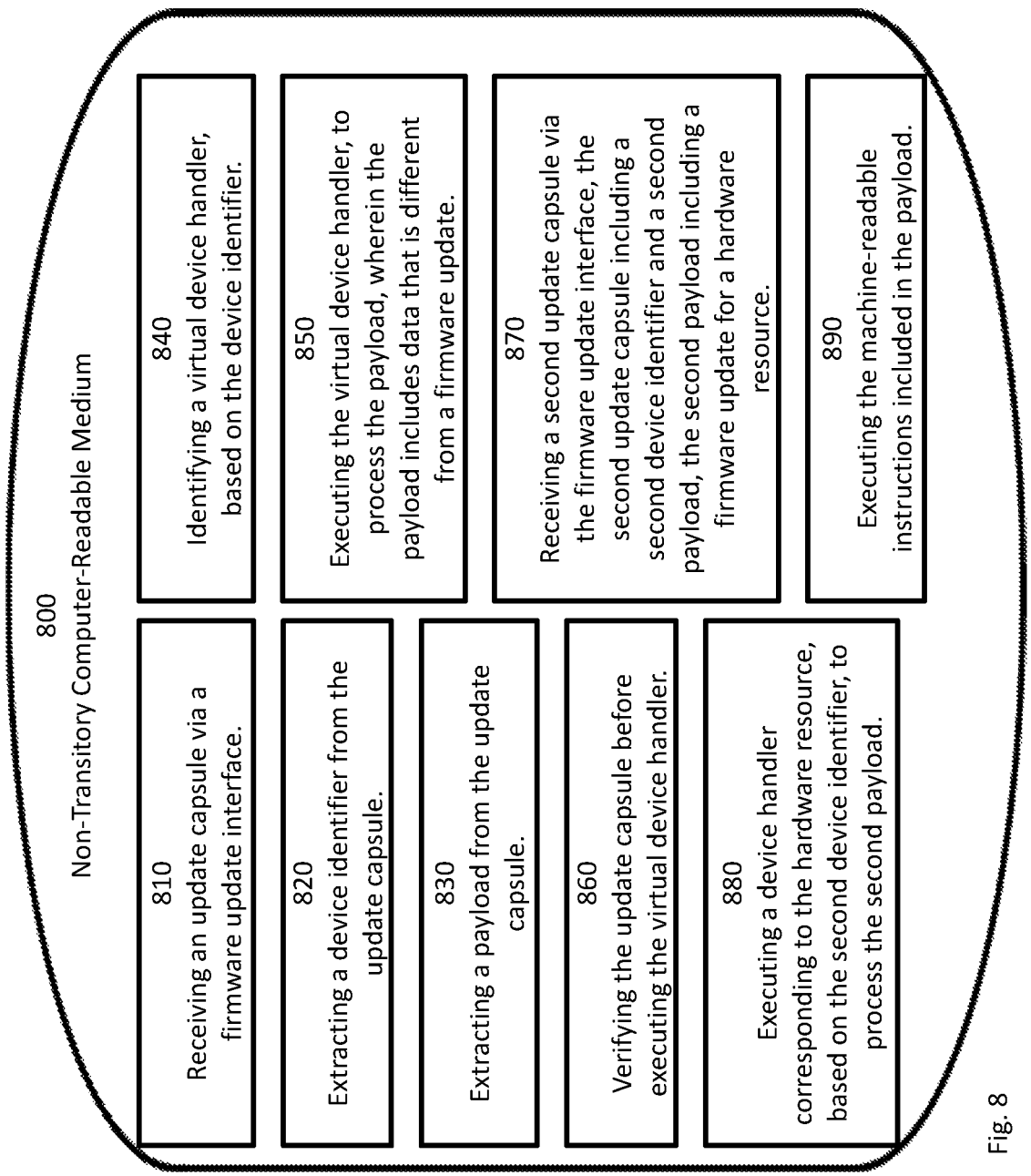
FIG. 8 shows a non-transitory computer-readable medium including machine-readable instructions in accordance with various examples.

FIG. 8 shows a non-transitory computer-readable medium 800 including machine-readable instructions 810, 820, 830, 840, 850, 860, 870, 880, 890 in accordance with various examples. When executed by a processor, machine-readable instruction 810 may cause the processor to receive an update capsule via a firmware update interface. When executed by a processor, machine-readable instruction 820 may cause the processor to extract a device identifier from the update capsule. When executed by a processor, machine-readable instruction 830 may cause the processor to extract a payload from the update capsule. In various examples, only a portion of the payload may be extracted from the update capsule. When executed by a processor, machine-readable instruction 840 may cause the processor to identify a virtual device handler, based on the device identifier. When executed by a processor, machine-readable instruction 850 may cause the processor to execute the virtual device handler, to process the payload, where the payload includes data that is different from a firmware update. When executed by a processor, machine-readable instruction 860 may cause the processor to verify the update capsule before executing the virtual device handler. When executed by a processor, machine-readable instruction 870 may cause the processor to receive a second update capsule via the firmware update interface, the second update capsule including a second device identifier and a second payload, the second payload including a firmware update for a hardware resource. In various examples, the second payload may not include a firmware update. When executed by a processor, machine-readable instruction 880 may cause the processor to execute a device handler corresponding to the hardware resource, based on the second device identifier, to process the second payload. In various examples, the payload from the update capsule or second update capsule may include machine-readable instructions to be executed by the processor. When executed by a processor, machine-readable instruction 890 may cause the processor to execute the machine-readable instructions included in the payload.

Figure 9:
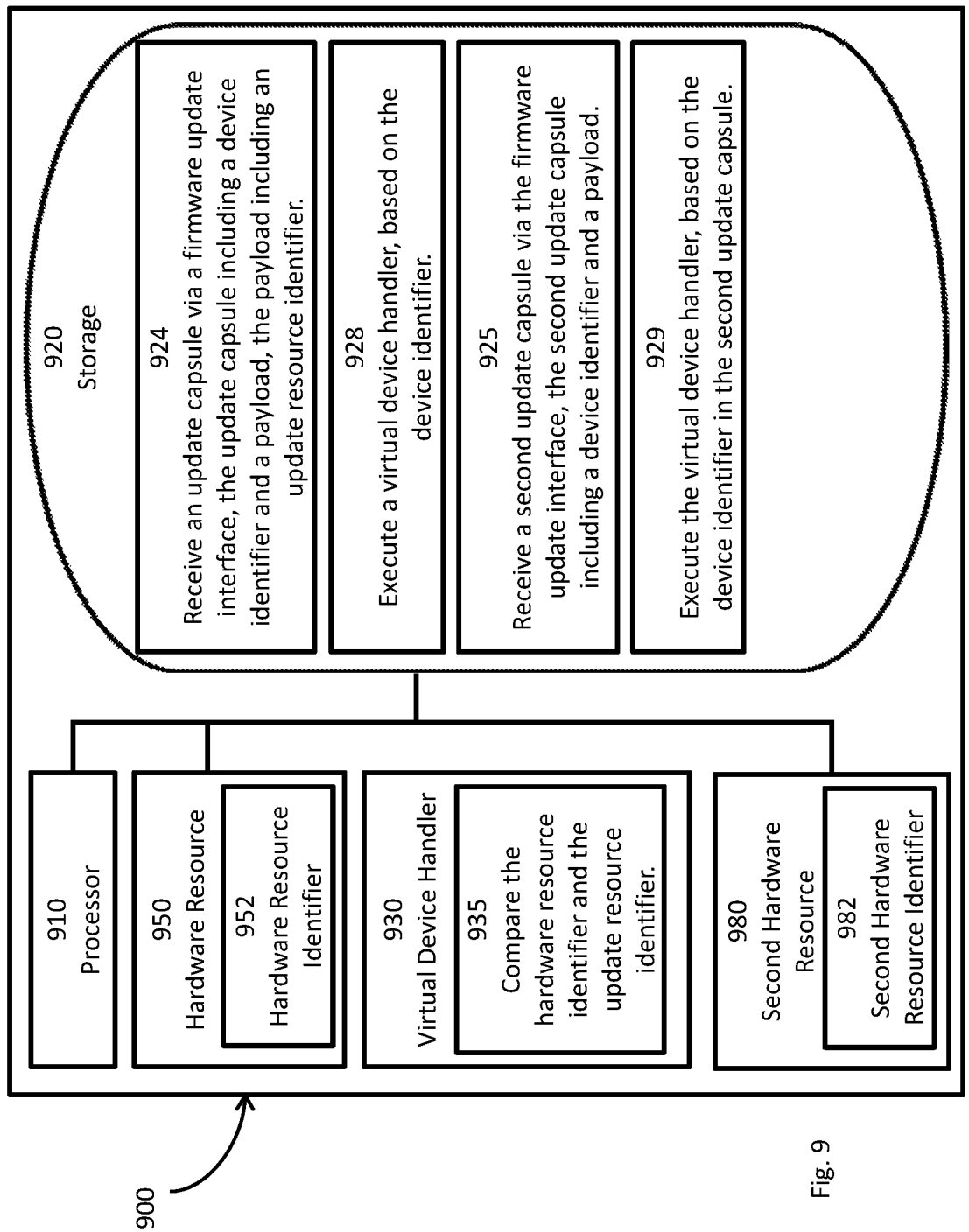
FIG. 9 shows a computer system with two hardware resources and a virtual device handler to handle update capsules in accordance with various examples.

FIG. 9 shows a computer system 900 with two hardware resources 950, 980 and a virtual device handler 930 for handling update capsules in accordance with various examples. Computer system 900 may include processor 910, storage 920, hardware resource 950, second hardware resource 980, and virtual device handler 930. Processor 910 may be coupled to storage 920, hardware resource 950, and second hardware resource 980. Hardware resource 950 may include hardware resource identifier 952. Second hardware resource 980 may include second hardware resource identifier 982.

Storage 920 may include machine-readable instructions 924, 928, 925, 929. When executed by a processor, machine-readable instruction 924 may cause the processor to receive an update capsule via a firmware update interface, the update capsule including a device identifier and a payload, the payload including an update resource identifier. When executed by a processor, machine-readable instruction 928 may cause the processor to execute a virtual device handler 930, based on the device identifier. When executed by a processor, machine-readable instruction 925 may cause the processor to receive a second update capsule via the firmware update interface, the second update capsule including a device identifier and a payload. When executed by a processor, machine-readable instruction 929 may cause the processor to execute the virtual device handler 930, based on the device identifier in the second update capsule.

Virtual device handler 930 may include machine-readable instruction 935. When executed by a processor, machine-readable instruction 935 may cause the processor to compare the hardware resource identifier and the update resource identifier. In various examples, virtual device handler 930 may cause an action to be performed if the update resource identifier corresponds to a hardware resource identifier 952 or a second hardware resource identifier 982. In various examples, virtual device handler 930 may change a setting of hardware resource 950 or second hardware resource 980, virtual device handler 930 may enable or disable hardware resource 950 or second hardware resource 980, virtual device handler 930 may query data from hardware resource 950 or second hardware resource 980, or virtual device handler 930 may present a message to a user of compute system 900 regarding hardware resource 950 or second hardware resource 980. Virtual device handler 930 may comprise a set of machine-readable instructions and may be stored in storage 920.

Figure 10:
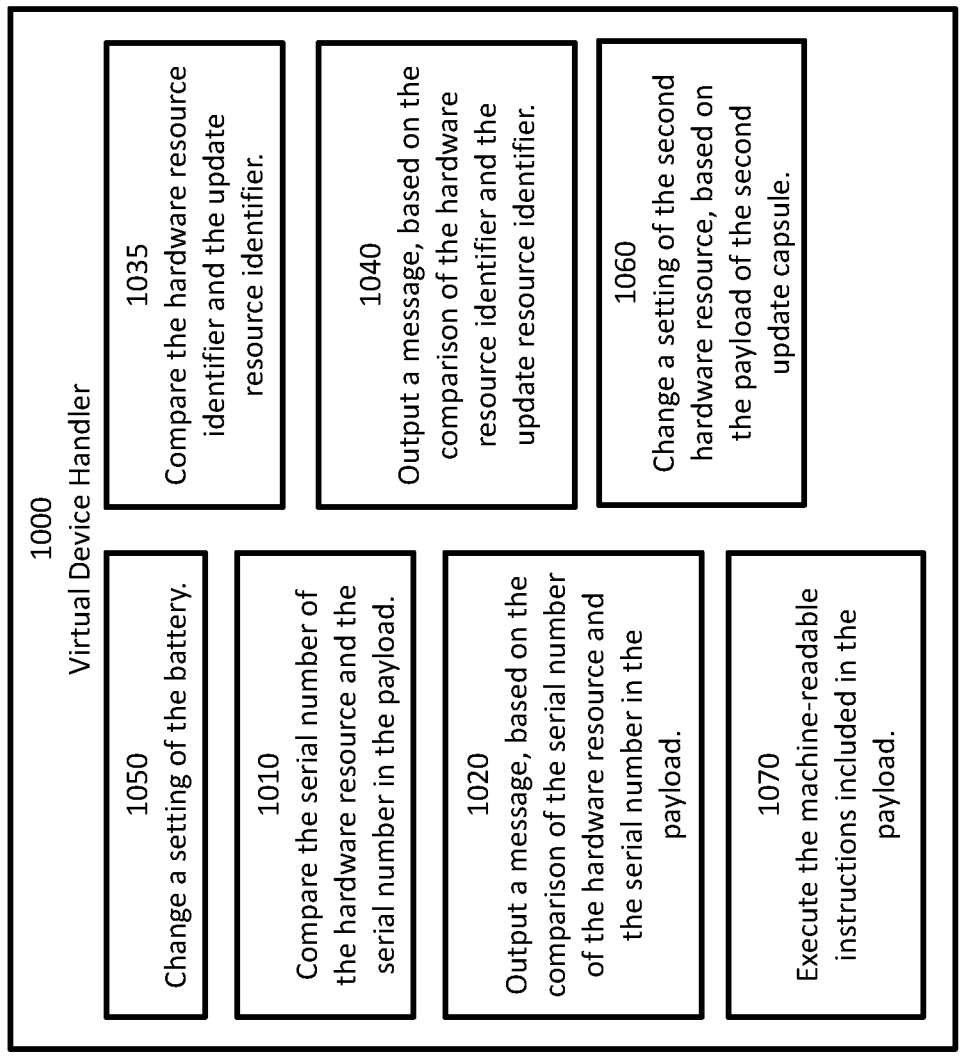
FIG. 10 shows a virtual device handler with machine-readable instructions in accordance with various examples.

FIG. 10 shows a virtual device handler 1000 with machine-readable instructions 1010, 1020, 1035, 1040, 1050, 1060, 1070 in accordance with various examples. A computer system may have a hardware resource that includes a serial number. The computer system may receive an update capsule including a payload that includes a serial number. When executed by a processor, machine-readable instruction 1010 may cause the processor to compare the serial number of the hardware resource and the serial number in the payload. When executed by a processor, machine-readable instruction 1020 may cause the processor to output a message, based on the comparison of the serial number of the hardware resource and the serial number in the payload.

In various examples, the computer system may include a hardware resource with a hardware resource identifier. The computer system may receive an update capsule including a payload that includes an update resource identifier. When executed by a processor, machine-readable instruction 1035 may cause the processor to compare the hardware resource identifier and the update resource identifier. When executed by a processor, machine-readable instruction 1040 may cause the processor to output a message, based on the comparison of the hardware resource identifier and the update resource identifier.

In various examples, the computer system may include a battery with settings that are changeable by the processor. When executed by a processor, machine-readable instruction 1050 may cause the processor to change a setting of the battery.

In various examples, the computer system may have a second hardware resource and receive a second update capsule. When executed by a processor, machine-readable instruction 1060 may cause the processor to change a setting of the second hardware resource, based on the payload of the second update capsule.

In various examples, the computer system may receive an update capsule including a payload that includes machine-readable instructions. When executed by a processor, machine-readable instruction 1070 may cause the processor to execute the machine-readable instructions included in the payload.

Figure 11:
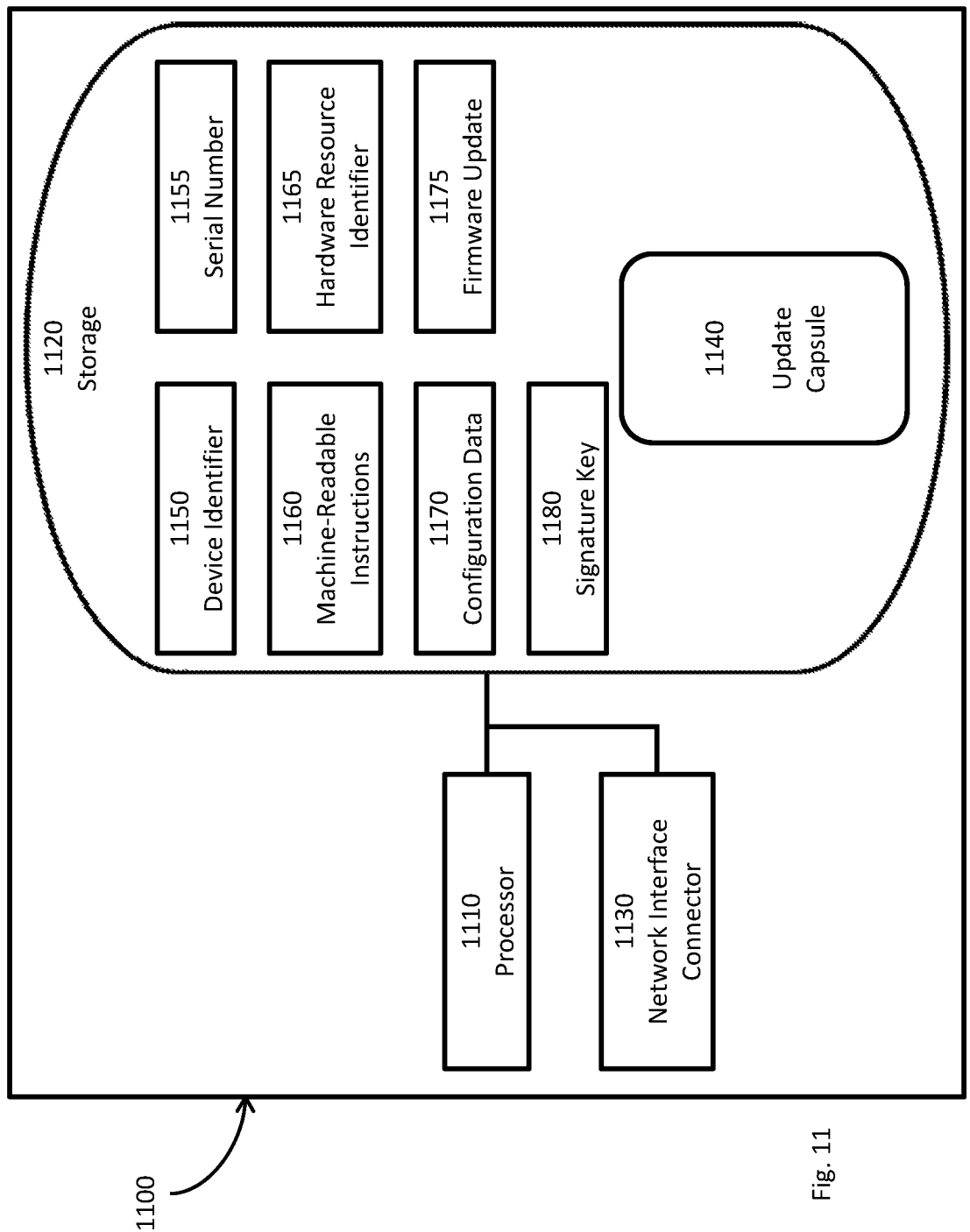
FIG. 11 shows a computer system to generate an update capsule.

FIG. 11 shows a computer system 1100 to generate an update capsule 1140. Computer system 1100 may include a processor 1110, storage 1120, and a network interface connector 1130. Processor 1110 may be coupled to storage 1120 and network interface connector 1130. Storage 1120 may include an update capsule 1140, which may be generated by computer system 1100. Storage may include device identifier 1150, serial number 1155, machine-readable instructions 1160, hardware resource identifier 1165, configuration data 1170, firmware update 1175, and signature key 1180.

Network interface connector 1130 may connect to a local area network. Computer system 1100 may connect to the Internet through network interface connector 1130 via the local area network. Computer system 1100 may send the update capsule 1140 to a target computer system for processing, via the network interface connector 1130. Computer system 1100 may send the update capsule 1140 to a server to host the update capsule 1140 for download to a target computer system for processing.

Device identifier 1150, serial number 1155, machine-readable instructions 1160, hardware resource identifier 1165, configuration data 1170, firmware update 1175, and signature key 1180 may be in a table or database. Processor 1110 may retrieve a device identifier 1150, serial number 1155, machine-readable instructions 1160, hardware resource identifier 1165, configuration data 1170, or firmware update 1175 from storage 1120 to store in update capsule 1140. Processor 1110 may retrieve a signature key 1180 from storage 1120 to digitally sign update capsule 1140. Device identifier 1150 may correspond to the virtual device handler of a computer system to receive update capsule 1140. A user may be involved in selecting the device identifier 1150, serial number 1155, machine-readable instructions 1160, hardware resource identifier 1165, configuration data 1170, firmware update 1175, or signature key 1180 used to generate update capsule 1140, or the process may be automated, such as by a script.

The following examples may further assist in understanding the concepts discussed above.

The computer system may be any of various computer systems, such as a laptop computer, a desktop computer, a mobile phone, an embedded computer system, or a virtual computer system running on a server. The computer system may include a firmware update interface for distribution of firmware updates via update capsules. UEFI, for example, includes a firmware update interface. Distribution of the firmware updates may include security checks, such as the use of passwords or digitally signing update capsules or payloads.

When the computer system receives an update capsule through the firmware update interface, it may identify a device handler to process the update capsule, based on a device identifier in the update capsule. The device identifier may uniquely identify a hardware resource or a class of hardware resources. The computer system may include a table of hardware resource identifiers to compare against device identifiers in the received update capsules. The table may include a reference to a device handler to execute in order to process the update capsule or the payload of the update capsule. The table and device handlers may be designed to implement a firmware update process.

The computer system may include a virtual device handler that may correspond to a hardware resource. In some examples, the virtual device handler may correspond to a hardware resource that cannot update its firmware using the firmware update process implemented by the table and device handlers. The virtual device handler may make use of the firmware update process infrastructure for other purposes, such as messaging the computer system or modifying system or device settings. In doing so, the virtual device handler may take advantage of security built into the firmware update process for secured delivery of messages or data.

In various examples, the virtual device handler may be used to notify a user of the computer system of recall notices. A manufacturer can provide an update capsule with a device identifier corresponding to the virtual device handler. The update capsule may include a set of serial numbers of hardware resources subject to recall. The virtual device handler may compare the serial numbers of hardware resources and the set of serial numbers of hardware resources subject to recall. If any serial numbers match, the virtual device handler may deliver a message to the user. The message may, for example, be displayed on a monitor and require acknowledgement by the user, such as clicking a button or pressing a key on a keyboard. The message may inform the user of the recall notice and which hardware is subject to recall. The message may also provide contact information for handling the recall. The message may be presented once or multiple times, such as every time the computer system initializes.

In various examples, the virtual device handler may also modify the configuration of the affected hardware resource. For example, the affected hardware resource may be a battery that is at risk of catching fire if charged above 80 percent or depleted below 20%. The virtual device handler may modify system settings of the computer system or settings on the battery to reduce the likelihood of those conditions occurring.

In various examples, the virtual device handler may be used to perform a remote modification of system initialization settings, such as the settings used by UEFI, BIOS, or other system initialization programs.

In various examples, the update capsule may be distributed by a network administrator, such as when a company is to make changes to computers used by its employees. In various examples, the update capsule may be distributed via a public distribution system, such as the Windows Update server.

In various examples, the firmware update interface may implement security protocols. Receipt of an update capsule that passes security protocols may be considered a secured event, and the update capsule may be handled automatically. In various examples, a user may approve processing of an update capsule by a device handler or virtual device handler.

In various examples, the computer system that generates the update capsule may receive an input file. The input file may specify models of hardware resources subject to a recall notice and actions to be taken for computer systems that include those hardware resources. The computer system may that generates the update capsule may use data in the input file or from other sources to identify a target computer system to receive an update capsule The computer system that generates the update capsule may generate the update capsule to include a device identifier that corresponds to the virtual device handler of the target computer system, a serial number for the hardware resource, and machine-readable instructions for notifying the user of the target computer system of the recall. The computer system may push the update capsule to the target computer or transfer the update capsule to another computer system for distribution.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
   a processor; and
   storage to store machine-readable instructions,
   wherein execution of the machine-readable instructions by the processor causes the processor to:
   receive an update capsule via a firmware update interface, the update capsule including a device identifier and a payload, the payload including data that is different from a firmware update, and
   execute a virtual device handler, based on the device identifier, to process the payload.

2. The system of claim 1, wherein the payload includes machine-readable instructions, and wherein the virtual device handler, when executed, causes the processor to execute the machine-readable instructions included in the payload.

3. The system of claim 1, wherein the storage is to store system settings, wherein the payload includes configuration data, and wherein the virtual device handler, when executed, modifies the system settings based on the configuration data.

4. The system of claim 1, wherein the update capsule includes a digital signature, and wherein execution of the machine-readable instructions causes the processor to verify the digital signature before execution of the virtual device handler.

5. The system of claim 1, further comprising a hardware resource, the hardware resource including a hardware serial number, wherein the payload includes a serial number, and wherein execution of the virtual device handler further causes the processor to:
   compare the hardware serial number and the serial number, and
   output a message, based on the comparison of the hardware serial number and the serial number.

6. A system comprising:
   a processor;
   a hardware resource, including a hardware resource identifier; and
   storage to store machine-readable instructions, wherein execution of the machine-readable instructions by the processor causes the processor to:
  receive an update capsule via a firmware update interface, the update capsule including a device identifier and a payload, the payload including an update resource identifier,
  execute a virtual device handler, based on the device identifier; and
wherein execution of the virtual device handler by the processor causes the processor to compare the hardware resource identifier and the update resource identifier.

7. The system of claim 6, wherein execution of the virtual device handler further causes the processor to output a message, based on the comparison of the hardware resource identifier and the update resource identifier.

8. The system of claim 7, wherein the hardware resource is a battery and the hardware resource identifier identifies a model of the battery.

9. The system of claim 8, wherein execution of the virtual device handler further causes the processor to change a setting of the battery.

10. The system of claim 9, further comprising:
  a second hardware resource, wherein execution of the machine-readable instructions by the processor further causes the processor to:
    receive a second update capsule via the firmware update interface, the second update capsule including a device identifier and a payload,
    execute the virtual device handler, based on the device identifier in the second update capsule; and
  wherein execution of the virtual device handler by the processor causes the processor to change a setting of the second hardware resource, based on the payload of the second update capsule.

11. A non-transitory computer-readable medium storing machine-readable instructions that, when executed by a processor, cause the processor to:
  receive an update capsule via a firmware update interface;
  extract a device identifier from the update capsule;
  extract a payload from the update capsule;
  identify a virtual device handler, based on the device identifier; and
  execute the virtual device handler, to process the payload, wherein the payload includes data that is different from a firmware update.

12. The non-transitory computer-readable medium of claim 11, wherein the machine-readable instructions, when executed by the processor, further cause the processor to: verify the update capsule before executing the virtual device handler.

13. The non-transitory computer-readable medium of claim 11, wherein the payload includes a firmware update.

14. The non-transitory computer-readable medium of claim 11, wherein the machine-readable instructions, when executed by the processor, further cause the processor to:
  receive a second update capsule via the firmware update interface, the second update capsule including a second device identifier and a second payload, the second payload including a firmware update for a hardware resource, and
  execute a device handler corresponding to the hardware resource, based on the second device identifier, to process the second payload.

15. The non-transitory computer-readable medium of claim 11, wherein the payload includes machine-readable instructions, and wherein the virtual device handler, when executed by the processor, further causes the processor to: execute the machine-readable instructions included in the payload.

16. The system of claim 1, wherein the data that is different from the firmware update include configuration data for a resource of the computer system that is not a firmware of the computer system, and wherein the processor is to execute the virtual device handler to process the payload to modify data settings of the computer system according to the configuration data.

17. The system of claim 1, wherein the payload includes an update resource identifier, wherein the processor is to execute the virtual device handler to process the payload to perform an action with respect to a hardware resource of the computer system identified by the update resource identifier, and wherein the virtual device handler is not a device handler for the hardware resource.

* * * * *